US006527172B1

(12) United States Patent
Lewis et al.

(10) Patent No.: US 6,527,172 B1
(45) **Date of Patent: *Mar. 4, 2003**

(54) AUTOMATED BANKING MACHINE ENCLOSURE

(75) Inventors: Kim R. Lewis, Stow, OH (US); Richard C. Lute, Jr., Mogadore, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/830,224

(22) PCT Filed: Nov. 15, 1999

(86) PCT No.: PCT/US99/27044

§ 371 (c)(1), (2), (4) Date: Apr. 23, 2001

(87) PCT Pub. No.: WO00/31694

PCT Pub. Date: Jun. 2, 2000

Related U.S. Application Data

(60) Provisional application No. 60/109,779, filed on Nov. 25, 1998.

(51) Int. Cl.[7] .......................... G06F 17/60; G06F 17/00

(52) U.S. Cl. .......................... 235/379; 235/375; 902/30

(58) Field of Search ................................ 235/375, 379; 705/43; 902/30

(56) References Cited

U.S. PATENT DOCUMENTS

| | | | | | |
|---|---|---|---|---|---|
| 4,649,832 | A | | 3/1987 | Hain et al. | |
| 4,754,126 | A | * | 6/1988 | Caldwell | 235/379 |
| 5,483,047 | A | | 1/1996 | Ramachandran et al. | |
| 5,752,239 | A | * | 5/1998 | Coutts | 345/419 |
| 5,788,348 | A | | 8/1998 | Ramachandran et al. | |
| 5,970,890 | A | | 10/1999 | Harry et al. | |
| 5,984,177 | A | | 11/1999 | Do et al. | |
| 6,000,806 | A | * | 12/1999 | Dallman | 186/37 |
| 6,061,666 | A | * | 5/2000 | Do et al. | 235/379 |

FOREIGN PATENT DOCUMENTS

| | | | | | |
|---|---|---|---|---|---|
| GB | 2225891 | A | * | 6/1990 | G07F/7/08 |
| JP | 08161587 | A | * | 6/1996 | G07D/9/00 |

* cited by examiner

*Primary Examiner*—Thien M. Le
*Assistant Examiner*—April Nowlin
(74) *Attorney, Agent, or Firm*—Daniel D. Wasil; Ralph E. Jocke; Walker & Jocke

(57) ABSTRACT

An automated banking machine includes a chest portion (14). Transaction function devices such as an input device (18) and a display screen (24) are supported on the chest portion. A generally one-piece polymer body (28) is operatively engaged relative to the chest portion and extends in generally surrounding relation of the input device and display screen. The body includes at least one opening (30) such that the display screen is visible and the input device is accessible through the body.

60 Claims, 6 Drawing Sheets

AUTOMATED BANKING MACHINE ENCLOSURE

This application claims benefit of provisional application No. 60/109,779 filed Nov. 25, 1998.

TECHNICAL FIELD

This invention relates to automated banking machines. Specifically this invention relates to an enclosure structure for an automated banking machine.

BACKGROUND ART

Automated banking machines are known in the prior art. A common type of automated banking machine is an automated teller machine (ATM). Users operate ATMs to conduct banking transactions. Transactions commonly conducted at ATMs include dispensing cash, making deposits, making account balance inquiries, making transfers between accounts, paying bills, cashing checks and other types of automated transactions. Other types of automated banking machines perform different or additional functions such as dispensing tickets, dispensing or receiving gaming materials, or providing payment for goods or services. For purposes of this disclosure any machine that is capable of accomplishing transactions involving transfers of value shall be considered an automated banking machine.

Automated banking machines include enclosures that house components used to carry out transactions. ATM enclosures are usually comprised of metal. The enclosure commonly includes a chest portion. The chest portion often houses currency, deposits and the mechanisms that handle these items. The chest portion also generally houses critical electronic components that must be protected from tampering. The chest portion also commonly has an access door which is controlled by a suitable lock. The lock prevents access to the interior of the chest by unauthorized personnel. The type of chest used often varies with the type of ATM and the location where the machine is to be installed. Machines which operate in environments where they may be unattended for substantial periods of time commonly have higher security chests and enclosures than machines which are installed in lobbies of buildings, stores or other places where guards or other people are usually present.

Banking machine enclosures also often include less secure portions in addition to the chest portion. These less secure enclosure portions house items such as printers, screen displays, card readers and other items that are less valuable and/or less susceptible to tampering than those items within the chest. While the less secure portions of ATM enclosures do not provide as high a degree of security as the chest portion, access to less secure portions is also generally controlled through locking mechanisms. This is done to discourage access and tampering by unauthorized personnel. The locking mechanisms generally enable authorized personnel to obtain quick access for purposes of routine maintenance such as changing paper rolls and printer ribbons.

Automated banking machine enclosures presently are generally constructed in a manner suitable for either a lobby installation environment or a through-the-wall installation environment. In a lobby installation environment the machine is generally freestanding within an interior area of a building. The machine is usually exposed on all sides except the bottom. As persons are generally present in close proximity to the machine in a lobby environment, an extremely high degree of security is generally not required.

This is because persons are generally present to report or stop any improper activity that is occurring to try to open the machine. Because the machine is in view in a lobby installation, efforts are generally made to make the enclosure look as attractive as possible. This is often done by forming the enclosure so that it includes rounded shapes, surface coatings, attractive color schemes and the like. This adds to the cost of the machine.

Another common type of ATM configuration is a through-the-wall configuration. In a through-the-wall installation, the machine is mounted so that the enclosure of the machine is positioned on a first side of an interior or exterior building wall. The customer interface of the machine is positioned to be accessible through an opening in the wall. A customer positioned on the opposite side of the wall from the enclosure is enabled to operate the machine. Through the wall machines are designed to be operated by users who either walk up or drive up to the interface. In such installations, the enclosure for the ATM is not required to be as attractive as a lobby unit because the enclosure is generally not visible to users of the machine.

When an ATM is mounted through an exterior wall of a building, steps generally must be taken to prevent damage to machine components due to the infiltration of rain and snow into the interior of the machine. As the machine interface is exposed to the elements, generally only the interface needs to be weatherproofed. The other portions of the enclosure are positioned inside a building structure which minimizes the exposure of components not adjacent to the interface to outside elements.

Sometimes it is desired to provide an automated banking machine in a location where there is no building wall through which a through-the-wall mounting may be made. In these situations it is common to construct a vestibule or similar enclosure for housing the ATM. The machine may then be mounted in the enclosure in a through-the-wall type configuration. In such circumstances, the vestibule serves as a small building for housing the ATM enclosure.

There are sometimes locations external to building lobbies where it would be desirable to position an ATM, but there is insufficient room to construct a vestibule or similar enclosure. For these locations there is no satisfactory banking machine which can be installed. While a machine designed for installation in a lobby may be placed in the location, such machines are generally not resistant to the elements and damage would soon occur due to exposure. Such damage may commonly occur due to infiltration of moisture and dirt into the machine and extremes of heat and cold. In addition, exterior locations are often unattended. This results in a greater risk of damage and break-in to the machine. Lobby units generally are not built to withstand lengthy attacks by machine tools that could more readily be attempted in an unattended external environment.

Thus there exists a need for an automated banking machine enclosure that can be installed in an external environment without requiring a surrounding vestibule or similar structure. There further exists a need for an automated banking machine enclosure that is durable and resistant to attack to a sufficient degree to be installed in an unattended outdoor environment.

There further exists a need for an automated banking machine enclosure that can be made more attractive at a relatively lower cost than existing enclosures. There further exists a need for an automated banking machine enclosure that is simpler in construction and which can be produced at a lower cost.

DISCLOSURE OF INVENTION

It is an object of the present invention to provide an automated banking machine enclosure.

It is a further object of the present invention to provide an automated banking machine enclosure that is sufficiently durable to withstand placement in an unattended outdoor environment.

It is a further object of the present invention to provide an automated banking machine enclosure that can be installed in an outdoor environment without the need for a surrounding vestibule.

It is a further object of the present invention to provide an automated banking machine enclosure that is more economical to manufacture and maintain.

It is a further object of the present invention to provide an automated banking machine enclosure that enables providing a machine with a more attractive appearance including various shapes and colors. The appearance may also include written information, such as public assistance or advertisements.

It is a further object of the present invention to provide an automated banking machine enclosure that provides ease of assembly.

It is a further object of the present invention to provide an automated banking machine enclosure that provides improved access to serviceable components within the machine.

It is a further object of the present invention to provide an automated banking machine enclosure that is suitable for use either in an indoor or outdoor environment.

It is a further object of the present invention to provide an automated banking machine enclosure that is economical yet resistant to attack.

It is a further object of the present invention to provide an automated banking machine enclosure that is capable of providing a controlled interior environment to facilitate more reliable operation of temperature sensitive components therein.

Further objects of the present invention will be made apparent in the following Best Modes For Carrying Out Invention and the appended claims.

The foregoing objects are accomplished in an exemplary embodiment of the present invention by an automated banking machine which comprises a frame. The frame is in supporting connection with at least one input device such as a card reader, keypad or function keys. The frame is also in supporting connection with an output device such as a display screen. The display screen may include a CRT display, LCD or touch screen display, flat panel display or other output device.

The automated banking machine further includes a generally one piece nonmetallic body. In an exemplary embodiment the body is made of a polymer. The polymer body is in operatively supporting engagement with the frame and extends in generally surrounding relation of the input devices and the display screen. The body includes at least one opening through which the display screen may be viewed and/or at least one input device may be accessed. In certain preferred forms of the invention. the polymer body is comprised of a reaction injection molded (RIM) thermoset olefin material, which enables producing machines with an attractive appearance, provides weather resistance, and provides resistance to many forms of attack.

BEST MODES FOR CARRYING OUT INVENTION

Figure 1:
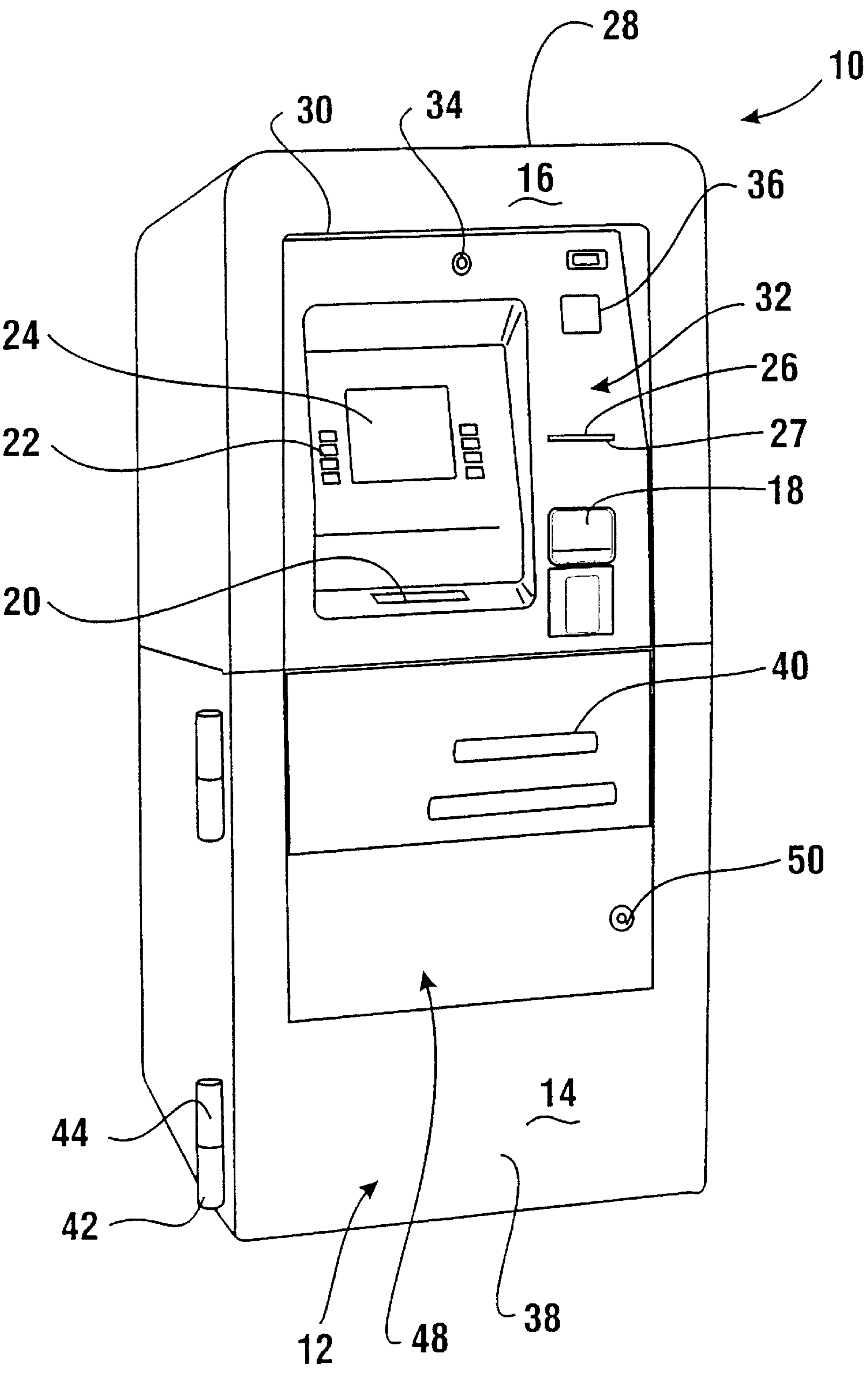
FIG. 1 is an isometric view of an automated banking machine having an enclosure which includes an exemplary embodiment of the present invention.

Referring now to the drawings and particularly to FIG. 1, there is shown therein an automated banking machine of a first exemplary embodiment of the present invention generally indicated 10. Automated banking machine 10 of this exemplary embodiment is an ATM suitable for conducting banking transactions. Machine 10 includes an enclosure generally indicated 12. Enclosure 12 includes a lower chest portion 14 and an upper portion 16.

Machine 10 includes input devices including a card reader schematically indicated 18. The card reader may comprise a magnetic type card reader, smart card reader or other device for reading card shaped articles. A fascia 32 includes a slot in generally aligned relation with the card reader. Other input devices on the exemplary machine include a keypad 20 and function buttons 22. Machine 10 further includes at least one output device such as a display screen 24. The display screen may have a touch screen. A printer 26 is positioned within the machine and also serves as an output device. The printer operates to deliver printed items to users of the machine through an opening 27 in the fascia 32. It should be appreciated that these input and output devices are exemplary and that other embodiments may include additional or different types of input devices which operate to receive information or instructions from users and/or output devices which provide information or instructions to users. The input and output devices in the embodiment shown are positioned adjacent to the fascia 32.

Fascia 32 also includes a camera opening 36. Camera opening 36 provides a field of view external of the machine for a camera mounted within the interior of the enclosure. The camera is used to capture images of users of the machine as well as persons who may be adjacent to the machine.

Upper portion 16 includes a generally one-piece nonmetallic body 28. The body may be comprised of any non-metallic material capable of being formed or joined into a generally unitary body. For example, such material may be comprised of plastic, polymer, fiberglass, resin, or glass, or any combination of such. Body 28 generally surrounds the input and output devices on four (4) sides. Body 28 further includes an opening 30. Opening 30 is positioned such that the display screen may be viewed therethrough. In the embodiment shown other input and output devices may also be accessed through the opening 30.

In the condition shown in FIG. 1 the fascia 32 is positioned in generally closing relation relative to the opening 30. Fascia 32 has a locking mechanism schematically indicated 34 associated therewith. Locking mechanism 34 may be selectively actuated by authorized personnel so that the fascia may be moved to a position in which it is generally no longer positioned in closing relation relative to opening 30.

The chest portion 14 includes a chest door 38. Chest door 38 includes a cash delivery opening 40. Cash delivery opening 40 is used to deliver cash stored in the interior area of the chest portion to users of the machine. As will be appreciated, supplies of currency notes are housed in the chest portion along with a dispenser mechanism which is selectively operative to deliver currency notes to the user through the cash delivery opening 40.

Chest portion 14 includes a body 42. Chest body 42 is generally box shaped in this form of the invention. However in other embodiments the chest body may be polygonal, circular, or any shape and appearance to correspond to or complement the shape and appearance of polymer body 28. Chest door 38 in the embodiment shown is movably mounted relative to body 42 by hinges 44. Chest door 38 is enabled to be opened by authorized users to access items in the interior area by opening a lock 46 (see FIG. 2). In the operative position of the machine 10, a movable panel 48 is positioned in overlying relation of the actuating mechanism for the chest lock 46. A locking mechanism 50, such as a key lock, must be actuated by authorized personnel to gain access to the actuating mechanism for the chest lock 46. The chest portion 14 may serve to support the input and output devices and the polymer body 28.

As shown in FIG. 1, the automated banking machine 10 of the first embodiment is suitable for installation in an outdoor environment, such as on a curb as shown. As later explained, automated banking machine 10 is particularly well-suited for an outdoor environment because of useful characteristics associated with its enclosure construction. The machine 10 of this exemplary embodiment also occupies relatively less space than an automated banking machine positioned in a vestibule or similar structure.

Figure 2:
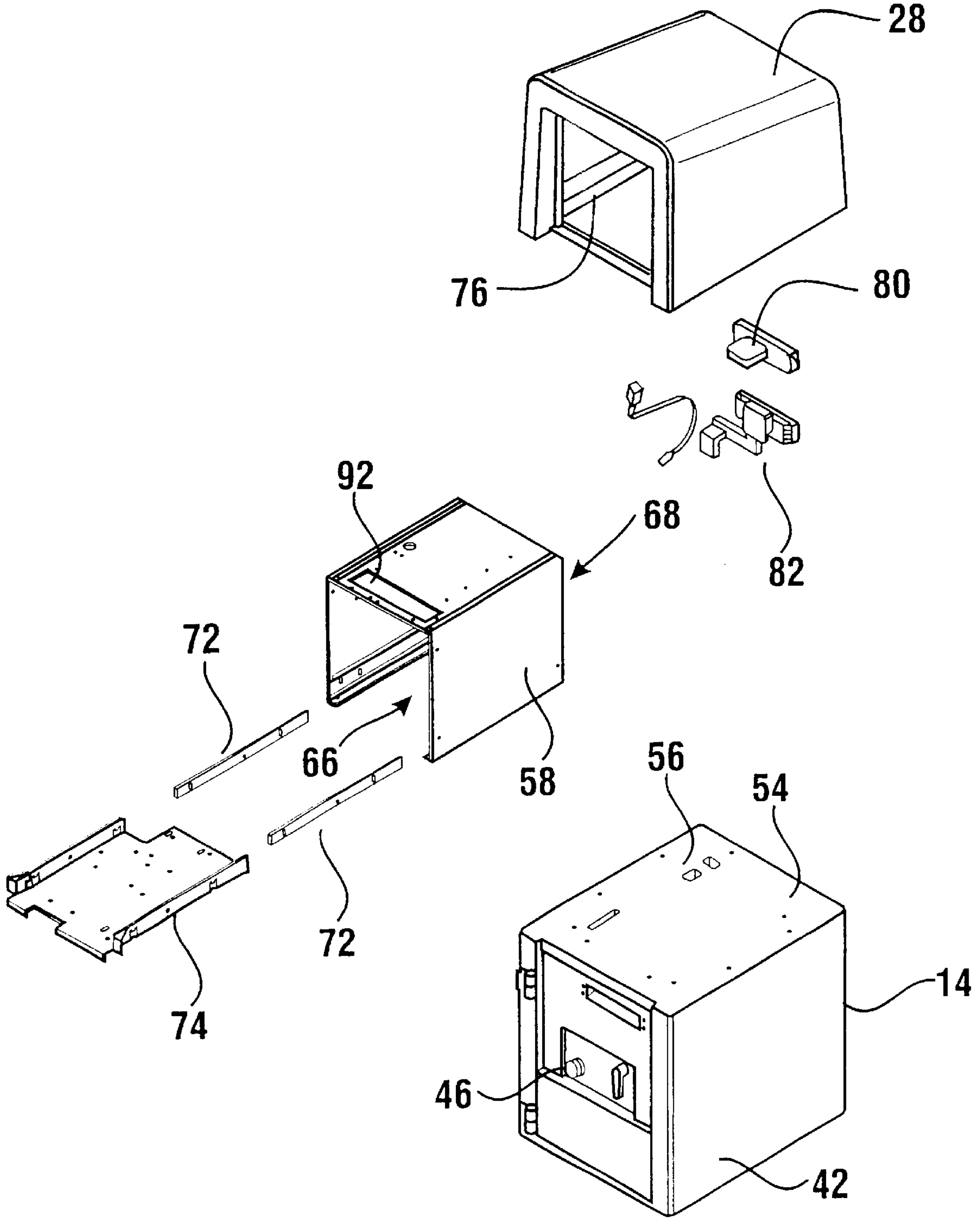
FIG. 2 is an isometric exploded view of the automated banking machine enclosure shown in FIG. 1.
Figure 3:
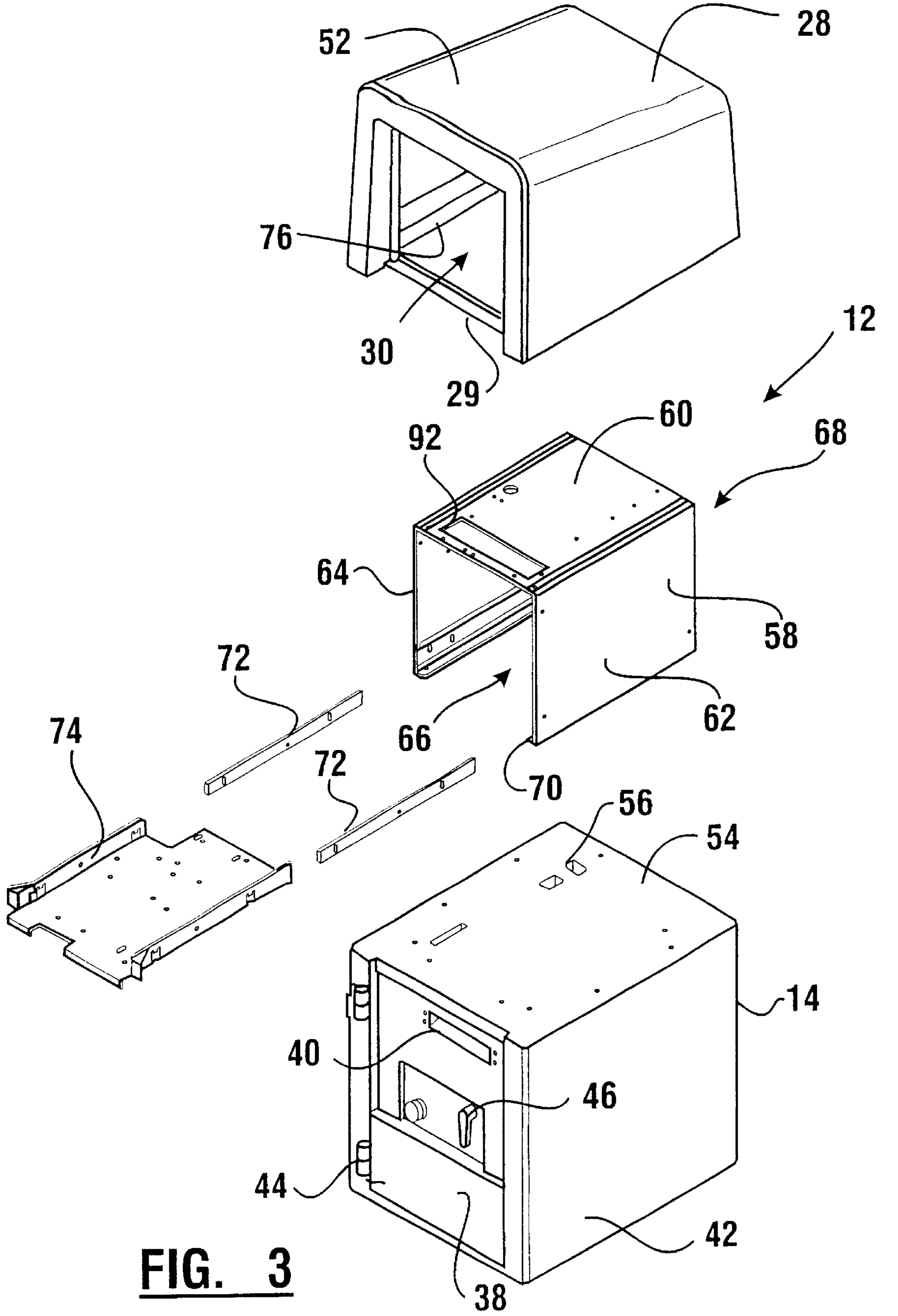
FIG. 3 is a further exploded isometric view of the enclosure of the automated banking machine shown in FIG. 1.

As shown in FIGS. 2 and 3, the enclosure 12 of machine 10 includes body 28. In this exemplary embodiment, body 28 is comprised of a generally one-piece polymer body comprised of reaction injection molded (RIM), thermoset olefin plastic material. In the described embodiment the thermoset olefin material is of the type produced by the polymerization of dicyclopentadine (DCPD) based co-monomers. Such materials provide suitable strength, weather, impact and heat resistance to achieve a suitable body for indoor or outdoor operation of the exemplary automated banking machine. An example of a commercially available polymer of this type is sold under the brand Telene™ by the BF Goodrich Company or Metton™ by Metton America. In this exemplary embodiment, body 28 is molded generally as a single piece and may be molded into selected shapes to provide an attractive appearance for the machine. Alternatively the body may be formed from a plurality of joined, engaging or interlocking pieces to form a generally unitary body. In addition, body 28 includes a top surface 52 that is sloped away from the opening 30 in the body. This generally facilitates conducting rain, snow, dirt and the like, away from the input and output devices which are accessible through the opening. The top surface 52 is further generally smoothly integrated into the sides of the body 28 to facilitate the shedding of moisture therefrom as well as to provide an attractive profile.

Chest portion 14 of enclosure 12 is preferably made of a cast material. In the described embodiment, body 42 is cast of a-high strength concrete material. This high strength concrete material may be of numerous types including, for example, the type described in U.S. Pat. No. 4,593,627, owned by the Assignee of the present invention, the teachings of which patents are incorporated herein by reference. In other embodiments other suitable cast or fabricated structures may be used. Additionally, the chest portion may comprise an insertable, removable, replaceable or reusable filler material. Such material may include sand, water, or other suitable granular or fluidic material which serves as a filler for cavities in the chest structure. The use of a filler material which can be inserted at the installation site provides for easier transport of the chest portion. The filler material may also be removable and recycled. Alternatively the filler material may be of the type that undergoes a change from a generally fluid to a generally solid state after it is added to the filler cavities in the chest portion. Securing structures such as anchors or other members may be attached to the chest body 42. Furthermore, the chest body may be integral with an adjacent walking surface, such as a concrete sidewalk. The entire enclosure, or parts thereof, may be produced to include specific figures and shapes, for example cartoon characters for use at amusement parks. The enclosure may also be produced in the shape and colors of specific football helmets, baseball caps, soccer balls, and other ornamental shapes and colors.

In the described embodiment the body 28 conforms closely in texture and appearance to the exterior of the chest body 42 such that both appear to a user to be made of the same material. Chest body portion 42 includes a top surface 54. Top surface 54 includes a plurality of openings 56 therethrough. Openings 56 provide access for electrical and other connections between items in the interior of the chest portion 14 and items in the upper portion 16 of the enclosure. Top surface 54 also includes a plurality of fastener accepting openings therein as shown.

A cover 58 is mounted in supporting connection with the top surface of the chest body. The cover is adapted to house input and output devices. Cover 58 includes a top 60, a first side 62 and a second side 64. The top and sides of the cover define a front opening, generally indicated 66, and a rear opening, generally indicated 68. The sides 62 and 64 include flange areas 70 through which fasteners may extend and secure the cover 58 to the chest. The chest body and the cover comprise a frame for supporting transaction function devices.

In this exemplary embodiment, a pair of opposed slides 72 are mounted in supporting connection with sides 62 and 64 of the cover. A roll-out tray 74 is movably mounted in supporting connection with the slides 72.

This configuration enables the tray 74 to be selectively moved outward through the front opening 66 in the cover and the opening in the surrounding body 28. In the described embodiment. the tray 74 is in supporting connection with the display screen as well as with the card reader, receipt printer, keypad and function buttons. Tray 74 is also in supporting connection with the fascia 32. As will be appreciated in FIG. 1, this construction enables an authorized service person to unlock locking mechanism 34 and to move tray 74 outward for purposes of accessing the components thereon for service activities.

Body 28 further includes flange areas 76 which extend in a lower interior area thereof. Flange areas 76, through which fasteners may extend, are used to attach body 28 to the top surface of chest body 42. Hence, the body may be mounted in supported connection with the chest portion. This construction serves to prevent unauthorized persons from obtaining access to the fasteners holding body 28 in position. The flange areas may be connected to corresponding flange areas 43 on the chest portion, or they may be directly secured to the chest portion by fasteners, such as screws 45. FIGS. 4A and 4B show suitable exemplary fastening arrangements.

Other fastening arrangements may be used to reduce the number of fasteners. For example, flange area 76 may be extended to align with flange area 70, or vice versa.

Figure 4:
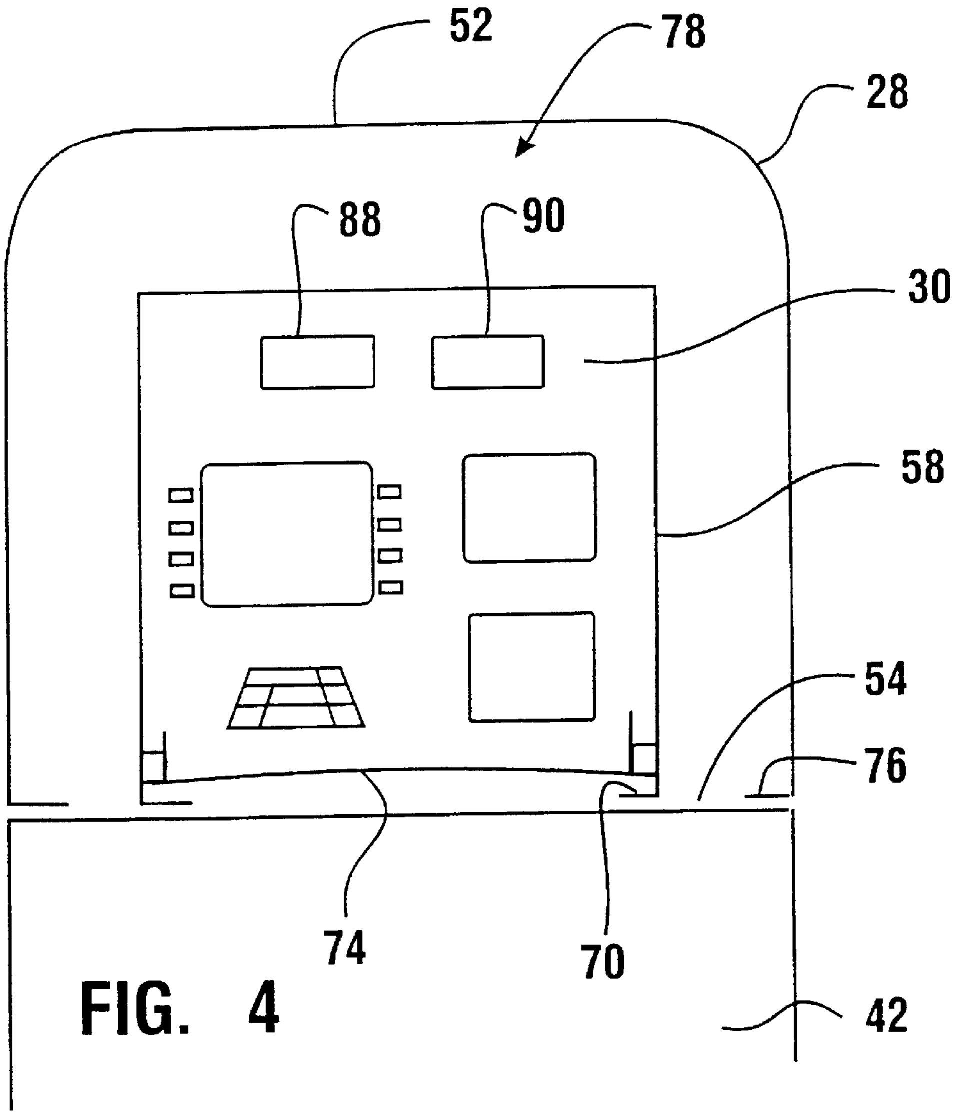
FIG. 4 is a schematic front plan view of the automated banking machine shown in FIG. 1.
Figure 4A:
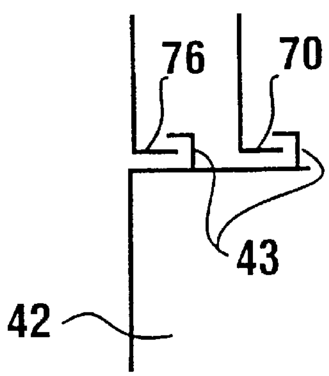
FIGS. 4A and 4B show different fastening arrangements for the automated banking machine shown in FIG. 4.
Figure 4B:
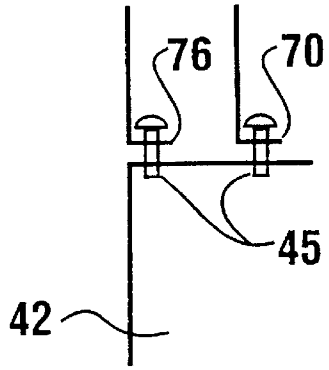
Figure 5:
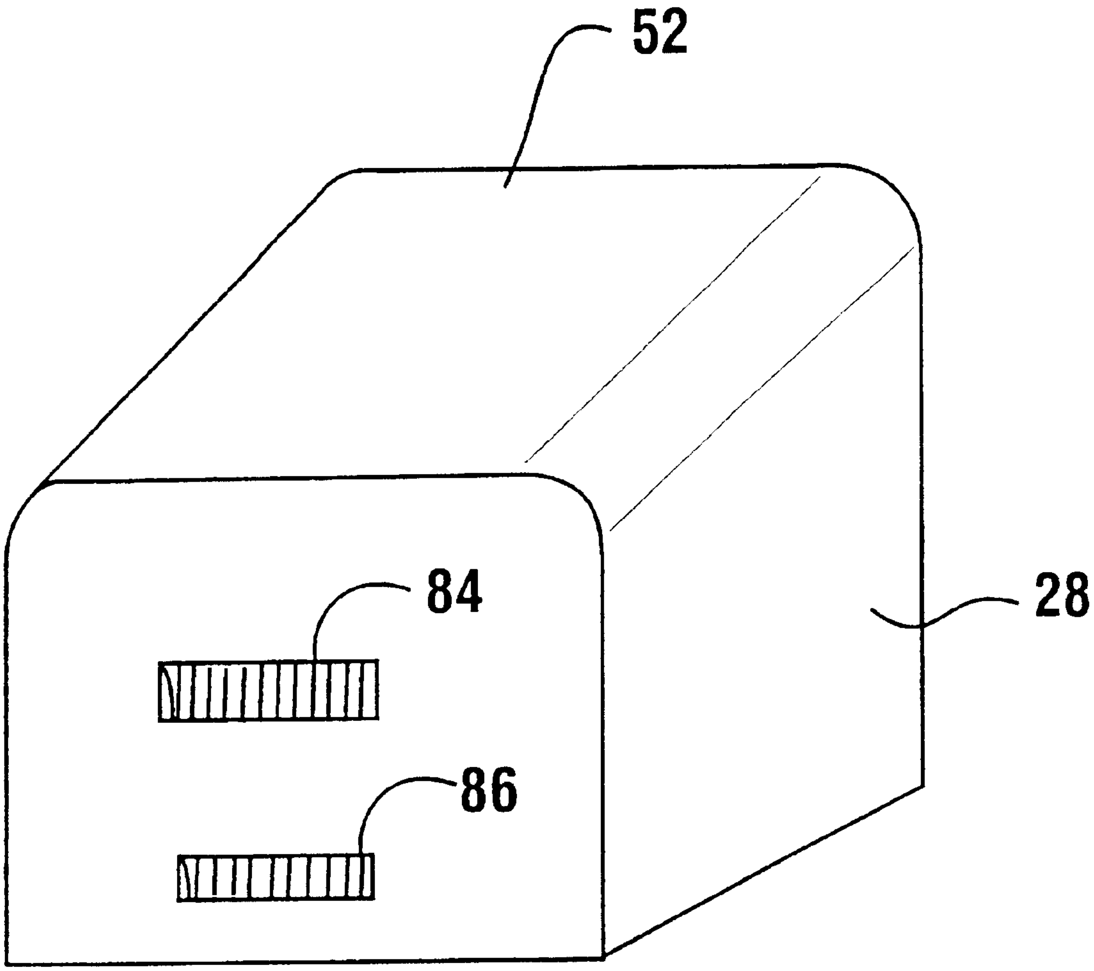
FIG. 5 is a rear isometric view of the body portion of the automated banking machine shown in FIG. 1.

As can be appreciated from FIGS. 4 and 5, body 28 generally surrounds cover 58 on all sides except in the area of body opening 30 and the bottom opening 29. Cover 58 may be adapted to fit through body opening 30 or body bottom opening 29. An interior surface bounding body 28 is also disposed outward from the outer surface of cover 58 in the described embodiment so as to define an air space generally indicated 78 between the body and the cover. The air space 78 in the described embodiment is operative to provide enhanced thermal insulation between the cover 58 and the exterior of the machine. The air space 78 also serves to isolate the body 28 from the components which are supported in connection with cover 58. As a result, the force of impacts to the body 28 are less likely to be transmitted to such components and cause damage thereto. In alternative forms of the enclosure, the space between the body and the cover may be filled with foam, fiber or other shock or thermal resistance material.

As shown in FIG. 2, in the exemplary embodiment body 28 houses an inlet blower 80 and an outlet blower 82. Inlet blower 80 is in operative fluid connection with an opening 84 on the rear of body 28 shown in FIG. 5. Outlet blower 82 is in fluid connection with an opening 86 on the rear of body 28. The blowers 82 and 80 may be selectively operated to facilitate the transfer of air into and out of the air space 78 for heating and cooling purposes. As schematically represented in FIG. 4, a heater element 88 and a cooling element 90 are provided within the cover 58 of the exemplary embodiment to maintain temperatures therein within a range desirable for operation of the components of the banking machine within the cover and/or within the chest. An air passage 92, shown in FIGS. 2 and 3, facilitates the passage of air between the interior of the cover 58 and the air space 78. Of course, suitable thermostats and other temperature control devices may be provided for sensing and maintaining the desired temperatures within the interior of the enclosure 12.

Figure 6:
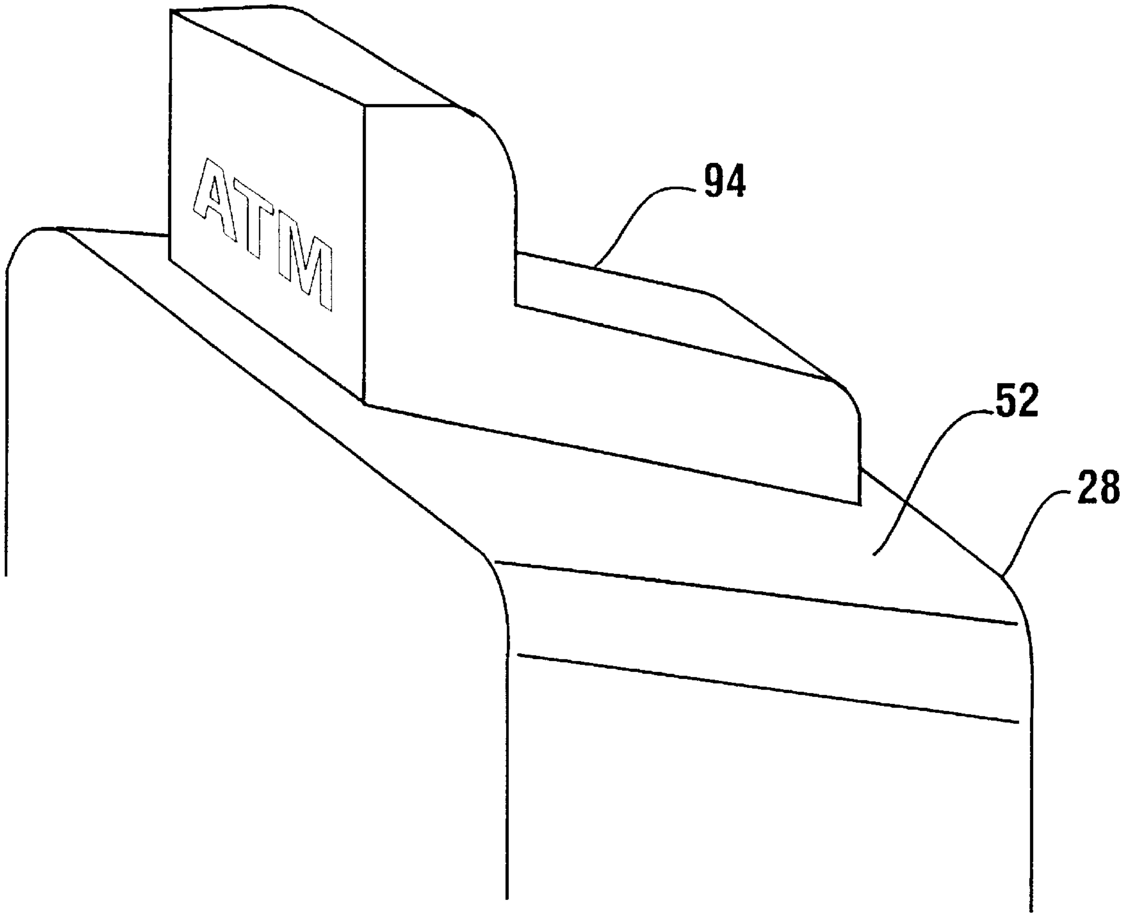
FIG. 6 is an isometric front view of the body portion shown in FIG. 5 with a light fixture positioned thereon.

As shown in FIG. 6, body 28 of enclosure 12 may be provided with a light fixture 94. Light fixture 94 of the described embodiment is supported on and attached to top surface 52 of the body 28. In the described form of the invention, light fixture 94 is a generally translucent enclosure housing a light source therein. A light fixture 94 preferably provides a light source which generates light outward therefrom generally parallel to the top surface 52 of the ATM. In the exemplary light fixture 94, light is generated in generally all directions parallel to the top surface 52. This provides lighting to the front, sides and back of the enclosure. This may be desirable when the machine is essentially freestanding. If, however, the machine is positioned in a corner area, for example, generating light through an angle of about 90 degrees may be sufficient to provide adequate lighting for operation of the machine.

As will be appreciated, the light fixture 94 may be readily attached to the body 28 in numerous ways. In addition, the presence of the air space underlying the surface of the body 28 in the exemplary embodiment facilitates the mounting and electrical connection of a light fixture. The components in the cover are generally isolated by the air space from heat produced by the light source in the light fixture.

As will be appreciated, the enclosure 12 of the exemplary automated banking machine 10 provides a durable, high-strength and weather-resistant enclosure for the components of the machine. The construction is well-suited to resist elements such as rain and snow encountered in outdoor environments. In addition, the space which is occupied by the machine 10 is smaller than space that would be needed for machines installed in vestibules or similar structures. Machine 10 further provides an attractive appearance due to its stylized enclosure and also provides the appearance of a unit that is entirely comprised of cast material. Machines of the invention may be made in numerous shapes. Of course, while the described form of the invention is particularly well-suited to an outdoor, unattended environment, the exemplary embodiment is also suitable for use in interior environments as well.

As will be appreciated, the embodiments of the invention provide substantial advantages over conventional automated banking machine enclosures. In the exemplary embodiment of the enclosure, the generally one piece polymer body extends in surrounding relation of the display screen, input devices and most other transaction function devices of the machine. The body also provides an attractive enclosure of the machine. The body may be molded in many attractive shapes. The body further provides an external protective structure that is highly resistant to various forms of attack. The enclosure also provides ease of assembly and improved access to the machine components for servicing the automated banking machine. The embodiments discussed herein are only a few examples of automated banking machine enclosures that may be achieved by employing the principles of the invention. Numerous other embodiments of the invention may be produced that are within the scope of the present invention.

Thus the automated banking machine enclosure of the present invention achieves the above-stated objectives, eliminates difficulties encountered in the use of prior devices and systems and attains the desirable results described herein.

In the foregoing description certain terms have been used for brevity, clarity and understanding. However, no unnecessary limitations are to be implied therefrom, because such terms are for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the structures or methods shown in the exemplary embodiment herein or mere equivalents thereof.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

We claim

1. An automated banking machine apparatus comprising:

at least one input device and at least one output device;

a chest portion operatively supporting the at least one input device and at least one output device;

a one-piece non-metallic body in supporting connection with the chest portion; wherein the body extends in generally surrounding relation of the at least one input device and at least one output device.

2. The apparatus according to claim 1, wherein the body comprises a plastic, polymer, fiberglass, resin, or glass, or any combination thereof.

3. The apparatus according to claim 2, wherein the body comprises a polymer.

4. The apparatus according to claim 3, wherein the body comprises a reaction injection molded thermoset olefin material.

5. The apparatus according to claim 2, wherein the at least one output device comprises a display screen, and wherein the body extends in generally surrounding relation of the input device and the display screen, and wherein the body includes at least one opening, wherein the display screen is visible through the at least one opening.

6. The apparatus according to claim 2, and further comprising a cover mounted above the chest portion, wherein the cover extends in generally surrounding relation of the at least one input device and the at least one output device, and wherein the body extends in generally surrounding relation of the cover.

7. The apparatus according to claim 6, wherein the body is disposed from the cover on at least three sides.

8. The apparatus according to claim 7, wherein an air space extends between the cover and the body.

9. The apparatus according to claim 8, wherein the body includes at least one air passage therethrough, and wherein the air passage is in fluid communication with the air space.

10. The apparatus according to claim 6, wherein the cover is a generally rectangular housing having a top and a pair of disposed sides defining a front opening and a rear opening, and wherein the body overlies the top, both sides, and the rear opening.

11. The apparatus according to claim 10, wherein the at least one output device comprises a display screen, and wherein the body extends in generally surrounding relation of the input device and the display screen;

and wherein the body includes at least one opening, wherein the display screen is visible through the at least one opening;

and wherein the at least one opening of the body further includes a fascia opening;

and wherein the fascia opening is generally aligned with the front opening of the cover;

and further comprising a movable fascia in movable supporting connection with the cover, wherein the fascia is movable into generally overlying relation of the fascia opening.

12. The apparatus according to claim 11, and further comprising a roll-out tray in supporting connection with the cover, and wherein the fascia, display screen, and input device are in supporting connection with the roll-out tray.

13. The apparatus according to claim 2, wherein the body includes a top surface, and further comprising a light fixture in supporting connection with the top surface, wherein the light fixture generates light generally parallel to the top surface and through an angle of generally about ninety degrees.

14. The apparatus according to claim 2, wherein the body includes a top surface, and wherein the body includes at least one opening, and wherein the top surface is sloped generally away from the at least one opening.

15. The apparatus according to claim 2, wherein the chest portion comprises a body, wherein the chest portion body comprises concrete.

16. The apparatus according to claim 4, wherein the chest portion comprises a chest portion body, wherein the chest portion body comprises concrete.

17. The apparatus according to claim 2, wherein the chest portion comprises a chest portion body, wherein the chest portion body comprises an insertable granular or fluidic material therein.

18. The apparatus according to claim 2, wherein the body is supported on and connected to the chest portion.

19. The apparatus according to claim 6, wherein the cover comprises at least four sides, and wherein the body generally extends on four sides of the cover.

20. The apparatus according to claim 6, wherein the cover is removably insertable into the body.

21. The apparatus according to claim 20, wherein the body comprises a side opening, and wherein the cover is removably insertable into the side opening.

22. The apparatus according to claim 20, wherein the body comprises a bottom opening, and wherein the cover is removably insertable into the bottom opening.

23. The apparatus according to claim 5, wherein the display screen comprises a touch screen.

24. An automated banking machine apparatus comprising:

at least one input device and at least one output device;

a chest portion operatively supporting the at least one input device and at least one output device;

a cover in supporting connection with the chest portion, wherein the cover operatively supports the at least one output device and at least one input device;

a unitary non-metallic body in supporting connection with the chest portion, wherein the body extends in generally surrounding relation of the cover.

25. The apparatus according to claim 24, wherein the body comprises a polymer.

26. The apparatus according to claim 25, wherein the body comprises a reaction injection molded thermoset olefin material.

27. The apparatus according to claim 25, wherein the chest portion comprises a body, wherein the chest portion body comprises concrete.

28. An automated banking machine apparatus comprising:

at least one input device and a display screen;

a chest portion, wherein the chest portion comprises a body, wherein the chest portion body comprises concrete, and wherein the chest portion operatively supports the at least one input device and display screen;

a cover in supporting connection with the chest portion, wherein the cover operatively supports the at least one input device and display screen;

a unitary polymer body in supporting connection with the chest portion, wherein the body extends in generally surrounding relation of the cover, and wherein the body includes at least one opening, wherein the display screen is visible through the at least one opening.

29. The apparatus according to claim 28, wherein the body comprises a reaction injection molded thermoset olefin material.

30. An automated banking machine apparatus comprising:

at least one input device and a display screen;

a chest portion, wherein the chest portion comprises a body, wherein the chest portion body comprises concrete, and wherein the chest portion operatively supports the at least one input device and display screen;

a cover in supporting connection with the chest portion, wherein the cover operatively supports the at least one input device and display screen;

a movable fascia in movable supporting connection with the cover;

a roll-out tray in supporting connection with the cover, wherein the fascia, display screen, and input device are in supporting connection with the roll-out tray;

a one-piece polymer body in supporting connection with the chest portion, wherein the body extends in generally surrounding relation of the cover, and wherein the body includes at least one opening, wherein the display screen is visible through the at least one opening.

31. A method of enclosing an automated banking machine, wherein a body extends in generally surrounding relation of at least one input device and at least one output device, comprising the steps of:

(a) operatively supporting at least one input device and at least one output device with a chest portion; and (b) mounting a one-piece non-metallic body in supporting connection with the chest portion.

32. The method according to claim 31, wherein prior to step (b) comprising the step of:

forming the body of a plastic, polymer, fiberglass, resin, or glass, or any combination thereof.

33. The method according to claim 32, wherein prior to step (b) comprising the step of:

forming the body of a polymer.

34. The method according to claim 33, wherein prior to step (b) comprising the step of:

forming the body of a reaction injection molded thermoset olefin material.

35. The method according to claim 32, further comprising the step of:

(c) mounting a cover in supporting connection with the chest portion, wherein the cover operatively supports the at least one input device and the at least one output device.

36. The method according to claim 35, wherein step (c) comprises the step of:

mounting the cover prior to step (b), wherein the body when mounted extends in generally surrounding relation of the cover.

37. The method according to claim 36, wherein the cover comprises a generally rectangular shape having a top and a pair of disposed sides defining a front opening and a rear opening, and wherein step (b) comprises the step of:

enclosing the pair of disposed sides and rear opening of the cover with the body.

38. The method according to claim 36, wherein step (b) includes:

producing an air space between the cover and the body.

39. The method according to claim 38, wherein the body includes an air passage therethrough, and wherein step (b) comprises the step of:

communicating the air space with the air passage.

40. The method according to claim 35, wherein prior to step (c) comprising the step of:

forming the cover with a generally rectangular shape having a top and a pair of disposed sides defining a front opening and a rear opening; and wherein step (b) comprises placing the body in overlying relationship with the top, both sides, and the rear opening of the cover.

41. The method according to claim 39, wherein the body comprises a fascia opening, and the cover is adapted to movably support a fascia; and prior to step (b) comprising the step of:

movably supporting the fascia in connection with the cover; and step (b) comprises the step of:

generally aligning the fascia opening with the front opening of the cover, wherein the fascia is movable into generally overlying relation of the fascia opening.

42. The method according to claim 40, wherein prior to step (b) comprising the step of:

positioning a roll-out tray in supporting connection with the cover, wherein the fascia, the at least one input device, and the at least one output device are in supporting connection with the roll-out tray.

43. The method according to claim 32, wherein the at least one output device comprises a display screen, and wherein the body extends in generally surrounding relation of the input device and the display screen, wherein the body includes at least one opening, and step (b) comprises the step of: generally aligning the display screen and the at least one opening so that the display screen is visible through the at least one opening.

44. The method according to claim 32, further comprising the step of:

attaching a light fixture in supporting connection with a top surface of the body, wherein the light fixture generates light generally parallel to the top surface and through an angle of generally about ninety degrees.

45. The method according to claim 32, wherein prior to step (b) comprising the step of:

forming the body with a top surface sloped generally away from the opening.

46. The method according to claim 32, wherein the chest portion comprises a chest portion body, and wherein prior to step (a) comprising the step of:

forming the chest portion body of concrete.

47. The method according to claim 34, wherein the chest portion comprises a chest portion body, and wherein prior to step (a) comprising the step of:

forming the chest portion body of concrete.

48. The method according to claim 32, wherein the chest portion comprises a chest portion body, and wherein prior to step (a) comprising the step of:

inserting into a cavity in the chest portion body a granular or fluidic material.

49. The method according to claim 32, wherein step (b) comprises the steps of:

supporting the body on the chest portion; and fastening the body to the chest portion.

50. The method according to claim 35, wherein step (c) comprises the steps of:

supporting the cover on the chest portion; and fastening the cover to the chest portion.

51. The method according to claim 35, wherein step (c) comprises the step of:

mounting the cover after step (b), wherein the cover when mounted is generally surrounded by the body.

52. The method according to claim 51, wherein the body comprises an opening, and wherein step (c) comprises:

removably inserting the cover into the opening of the body.

53. The method according to claim 35, wherein an output device comprises a touch screen display, wherein step (c) comprises the step of:

supporting the touch screen display with the cover.

54. The method according to claim 35, wherein an output device comprises a printer, wherein step (c) comprises the step of:

supporting the printer with the cover.

55. The method according to claim 36, wherein the body includes a bottom opening, wherein the step (b) comprises:

lowering the body over the cover wherein the cover extends in the bottom opening.

56. A method of enclosing an automated banking machine, wherein a body extends in generally surrounding relation of at least one input device and at least one output device, comprising the steps of:

(a) mounting a cover in supporting connection with a chest portion, wherein the cover operatively supports at least one input device and at least one output device; and (b) mounting a one-piece non-metallic body in supporting connection with the chest portion.

57. The method according to claim 56, wherein prior to step (b) comprising the step of:

forming the body of a polymer.

58. The method according to claim 56, wherein step (a) comprises the step of:

mounting the cover prior to step (b), wherein the body when mounted extends in generally surrounding relation of the cover.

59. The method according to claim 56, wherein step (b) comprises the step of:

mounting the body prior to step (a), wherein when the cover is mounted the body extends in generally surrounding relation of the cover.

60. A method of enclosing an automated banking machine, comprising the steps of:

(a) providing a chest portion, wherein the chest portion comprises a chest portion body, and wherein the chest portion body comprises concrete;

(b) providing at least one input device and a display screen in supporting connection with the chest portion;

(c) mounting a cover in supporting connection with the chest portion, wherein the cover operatively supports the at least one input device and display screen;

(d) providing a unitary polymer body; and (e) placing the body in supporting connection with the chest portion; wherein the body encloses in generally surrounding relation the cover, and wherein the body includes at least one opening, wherein the display screen is visible through the opening.

* * * * *